(12) United States Patent
Goeltz

(10) Patent No.: US 9,899,696 B2
(45) Date of Patent: Feb. 20, 2018

(54) SOLID BUFFER MATERIALS FOR ELECTROLYTE SOLUTIONS AND FLOW BATTERIES UTILIZING SAME

(71) Applicant: LOCKHEED MARTIN ADVANCED ENERGY STORAGE, LLC, Bethesda, MD (US)

(72) Inventor: John Goeltz, Carmel, CA (US)

(73) Assignee: Lockheed Martin Advanced Energy Storage, LLC, Bethesda, MD (US)

( * ) Notice: Subject to any disclaimer, the term of this patent is extended or adjusted under 35 U.S.C. 154(b) by 0 days.

(21) Appl. No.: 15/002,309

(22) Filed: Jan. 20, 2016

(65) Prior Publication Data

US 2016/0211539 A1 Jul. 21, 2016

Related U.S. Application Data

(60) Provisional application No. 62/105,768, filed on Jan. 21, 2015.

(51) Int. Cl.
*H01M 8/18* (2006.01)
*H01M 8/20* (2006.01)

(52) U.S. Cl.
CPC .............. *H01M 8/20* (2013.01); *H01M 8/188* (2013.01); *H01M 2300/0014* (2013.01); *Y02E 60/528* (2013.01)

(58) Field of Classification Search
CPC ..................... H01M 10/052; H01M 10/0525
See application file for complete search history.

(56) References Cited

U.S. PATENT DOCUMENTS 2,293,030 A * 8/1942 Foster ................... C01C 3/12
23/302 R
2,353,782 A 7/1944 Neumark
(Continued)

FOREIGN PATENT DOCUMENTS

FR          1533662 A      7/1968
WO    WO-2007/101284 A1   9/2007
WO      WO2012162383    * 11/2012

OTHER PUBLICATIONS

Cohen et al., "The Association of Ferrocyanide Ions With Various Cations," J Phys Chem, Aug. 1957, pp. 1096-1100, vol. 61, No. 8.
(Continued)

*Primary Examiner* — Olatunji Godo
(74) *Attorney, Agent, or Firm* — McDermott Will & Emery LLP

(57) ABSTRACT

Electrolyte solutions for flow batteries and other electrochemical systems can contain a dissolved iron hexacyanide complex as an active material. Alkaline buffering can be desirable in such electrolyte solutions to promote stability of the active material. However, the buffer material can undesirably decrease solubility of the iron hexacyanide complex to unacceptable levels in some instances. Compositions with increased concentrations of iron hexacyanide can include an aqueous solution containing a dissolved iron hexacyanide complex, and a solid buffer material in contact with the aqueous solution. The solid buffer material is present at an amount greater than that needed to produce a saturation concentration of the solid buffer material in the aqueous solution. Flow batteries and other electrochemical systems can contain the compositions as an electrolyte solution. Electrolyte solutions containing active materials other than an iron hexacyanide complex can also be stabilized by using an appropriate solid buffer material.

22 Claims, 2 Drawing Sheets

(56) References Cited

U.S. PATENT DOCUMENTS

| | | | |
|---|---|---|---|
| 2,415,792 | A | 2/1947 | Gravell |
| 3,573,984 | A | 4/1971 | Shah |
| 3,707,449 | A | 12/1972 | Reinhardt et al. |
| 3,876,435 | A | 4/1975 | Dollman |
| 3,919,000 | A | 11/1975 | Yarrington |
| 3,985,571 | A | 10/1976 | Reinhardt et al. |
| 3,985,585 | A | 10/1976 | Tuttle et al. |
| 4,046,861 | A | 9/1977 | Reinhardt et al. |
| 4,180,623 | A | 12/1979 | Adams |
| 4,378,995 | A | 4/1983 | Gratzfeld et al. |
| 4,563,403 | A | 1/1986 | Julian |
| 5,472,807 | A | 12/1995 | Licht et al. |
| 5,643,670 | A | 7/1997 | Chung |
| 5,876,581 | A | 3/1999 | Ltaya et al. |
| 6,475,661 | B1 | 11/2002 | Pellegri et al. |
| 7,935,366 | B2 | 5/2011 | Pahuja et al. |
| 8,187,441 | B2 | 5/2012 | Evans et al. |
| 2002/0159222 | A1 | 10/2002 | Nomoto et al. |
| 2007/0105022 | A1* | 5/2007 | Xiao ............... H01M 10/0567 429/330 |
| 2008/0145723 | A1 | 6/2008 | Wang et al. |
| 2010/0084600 | A1* | 4/2010 | Ahmad ............... G02F 1/1525 252/62.2 |
| 2010/0086823 | A1 | 4/2010 | Koshino et al. |
| 2011/0244277 | A1 | 10/2011 | Gordon, II et al. |
| 2012/0052347 | A1 | 3/2012 | Wilson et al. |
| 2012/0171541 | A1 | 7/2012 | Park et al. |
| 2012/0244406 | A1 | 9/2012 | Xia et al. |
| 2013/0252062 | A1 | 9/2013 | Wilkins et al. |
| 2013/0260021 | A1 | 10/2013 | Lu et al. |
| 2014/0028260 | A1 | 1/2014 | Goeltz et al. |
| 2014/0051003 | A1 | 2/2014 | Esswein et al. |
| 2014/0295311 | A1* | 10/2014 | Lipka ............... H01M 8/188 429/452 |
| 2016/0276692 | A1 | 9/2016 | Esswein et al. |
| 2016/0276696 | A1 | 9/2016 | Esswein et al. |
| 2016/0276697 | A1 | 9/2016 | Esswein et al. |

OTHER PUBLICATIONS

Gail et al., "Cyano Compounds, Inorganic," in Ullman's Encyclopedia of Industrial Chemistry, 2012, pp. 674-710, vol. 10.

Hollandsworth et al., "Zinc/Ferrocyanide Battery Development Phase IV," Lockheed Missiles and Space Company, Inc. Contractor Report, Sandia Contract DE-AC04-76DP00789, May 1985, 278 pages.

Kulesza et al., "Electrochemical preparation and characterization of hybrid films composed of Prussian blue type metal hexacyanoferrate and conducting polymer," Electrochimica Acta, Aug. 2001, pp. 4065-4073, vol. 46, No. 26-27.

Pharr et al., "Infrared Spectroelectrochemical Analysis of Adsorbed Hexacyanoferrate Species Formed during Potential Cycling in the Ferrocyanide/Ferricyanide Redox Couple," Anal Chem, Nov. 1997, pp. 4673-4679, vol. 69, No. 22.

Torres-Gomez et al., "Energy Storage in Hybrid Organic-Inorganic Materials Hexacyanoferrate-Doped Polypyrrole as Cathode in Reversible Lithium Cells," J of the Electrochemical Society, 2000, pp. 2513-2516, vol. 147, No. 7.

Trant, et al., "Solubility of Sodium Ferrocyanide and Potassium Ferrocyanide in Solutions of NaOH and KOH Mixtures at 25° C.," University of Rochester, The David T. Kearns Center, Xerox Undergraduate Research Fellows Program, Jul. 28, 2011, 1 page.

Vercillo, et al., "Solubility of Sodium Ferrocyanide in Sodium Hydroxide and Potassium Ferrocyanide in Potassium Hydroxide," University of Rochester, The David T. Kearns Center, Xerox Undergraduate Research Fellows Program, Jul. 28, 2011, 1 page.

Soloveichik, "Flow Batteries: Current Status and Trends," 2015, Chem. Rev., 115 (20), pp. 11533-11558.

* cited by examiner

SOLID BUFFER MATERIALS FOR ELECTROLYTE SOLUTIONS AND FLOW BATTERIES UTILIZING SAME

CROSS-REFERENCE TO RELATED APPLICATIONS

The present application claims the benefit of priority under 35 U.S.C. § 119 from U.S. Provisional Patent Application 62/105,768, filed on Jan. 21, 2015 and incorporated herein by reference in its entirety.

STATEMENT REGARDING FEDERALLY SPONSORED RESEARCH OR DEVELOPMENT

Not applicable.

FIELD

The present disclosure generally relates to energy storage and, more specifically, to flow batteries and other electrochemical systems containing coordination compounds as active materials within an electrolyte solution.

BACKGROUND

Electrochemical energy storage systems, such as batteries, supercapacitors and the like, have been widely proposed for large-scale energy storage applications. Various battery designs, including flow batteries, have been adopted for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing sides of a membrane or separator in an electrochemical cell containing negative and positive electrodes. The flow battery is charged or discharged through electrochemical reactions of the active materials that occur inside the cell. As used herein, the terms "active material," "electroactive material," "redox-active material" or variants thereof will refer to materials that undergo a change in oxidation state during operation of a flow battery or like electrochemical energy storage system (i.e., during charging or discharging). Although flow batteries hold significant promise for large-scale energy storage applications, they have often been plagued by lower than expected energy storage performance (e.g., round trip energy efficiency) and poor cycle life, among other factors. Despite significant development efforts, no commercially viable flow battery technologies have yet been developed.

In many instances, iron hexacyanide complexes can be highly desirable for use as active materials in flow batteries and other electrochemical energy storage systems. These complexes exhibit facile electrode kinetics and reversible electrochemical behavior at redox potentials near the oxidative thermodynamic stability limit of aqueous solutions. Further, these complexes are composed of abundant elements and are not overly expensive. As used herein, the term "iron hexacyanide complex" will refer to the oxidation-reduction couple of ferrocyanide (i.e., $Fe(CN)_6^{4-}$) and ferricyanide (i.e., $Fe(CN)_6^{3-}$). These complex ions can be present in any combination where the content of ferrocyanide and ferricyanide sums to 100%, including instances where there is 100% ferrocyanide or 100% ferricyanide. The compositional extremes represent a state of full discharge or full charge, depending upon the half-cell in which the active material is present. Various counterions can complete the charge balance of the iron hexacyanide complexes.

Despite the well understood and desirable oxidation-reduction behavior of iron hexacyanide complexes, these complexes unfortunately exhibit relatively limited solubility in aqueous solutions, thereby leading to low energy densities. Further, unwanted precipitation of the active material can occur if the electrolyte solution is near its saturation concentration. For flow batteries, in particular, it can be desirable to utilize an active material concentration that is somewhat removed from the saturation concentration to decrease the risk of unwanted precipitation and potential occlusion of circulation pathways and other components within the flow battery. This can further decrease the energy density.

Although the low solubility of iron hexacyanide complexes can be mitigated to some degree based upon the identity of the counterion, solubility often still remains a prevalent concern. Moreover, many of the counterions that improve solubility for iron hexacyanide complexes can exhibit varying degrees of incompatibility with certain flow battery components. For example, calcium and other divalent counterions can dramatically improve the solubility of iron hexacyanide complexes, but such counterions can be fouling toward thin membranes separating the flow battery's half-cells, thereby diminishing performance. Moreover, many divalent metal ions are prone toward formation of insoluble hydroxides under alkaline conditions.

For a variety of reasons, it can be desirable to solubilize iron hexacyanide complexes under alkaline conditions. Among other reasons, potential reactivity of the cyanide ligands with acid can be averted. Since the pH conditions in an electrolyte solution can frequently change over the course of repeated charging and discharging cycles (e.g., due to parasitic reactions), it can be desirable to include a buffer in the electrolyte solution to resist a potentially detrimental change in pH. While buffers can indeed help resist unwanted pH changes in an electrolyte solution, the dissolved buffer material can undesirably decrease the saturation concentration of the iron hexacyanide complex and further complicate an already challenging solubility profile. The decreased iron hexacyanide complex solubility of buffered electrolyte solutions can be particularly problematic in large-scale energy storage applications where high energy densities are desirable.

In view of the foregoing, buffered electrolyte solutions containing high concentrations of dissolved iron hexacyanide complexes would be highly desirable in the art. The present disclosure satisfies the foregoing need and provides related advantages as well.

SUMMARY

In some embodiments, the present disclosure provides compositions including an aqueous solution containing a dissolved iron hexacyanide complex, and a solid buffer material in contact with the aqueous solution. An amount of the solid buffer material is greater than that needed to produce a saturation concentration of the solid buffer material in the aqueous solution.

In other various embodiments, the present disclosure provides flow batteries containing a half-cell having an electrolyte solution containing the composition defined above.

In still other various embodiments, the present disclosure provides flow batteries containing a half-cell having an electrolyte solution therein that contains a dissolved electroactive material, and a solid buffer material in contact with the aqueous solution. An amount of the solid buffer material is greater than that needed to produce a saturation concentration of the solid buffer material in the aqueous solution.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
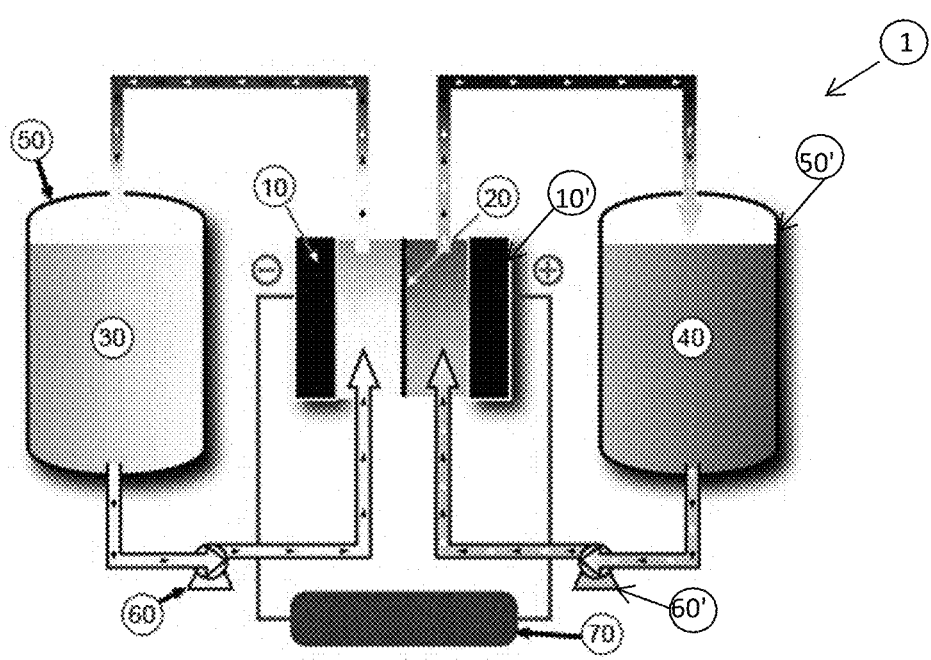
FIG. 1 depicts a schematic of an illustrative flow battery.

The present disclosure is directed, in part, to compositions containing a dissolved iron hexacyanide complex and a solid buffer material. The present disclosure is also directed, in part, to electrolyte solutions and flow batteries containing a dissolved iron hexacyanide complex and a solid buffer material. The present disclosure is also directed, in part, to electrolyte solutions and flow batteries containing a dissolved electroactive material and a solid buffer material.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure describes an electrochemical cell, flow battery, or other energy storage system, it is appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may constitute a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that can be operated on a large scale and maintain high operating efficiencies can be highly desirable. Flow batteries have generated significant interest in this regard, but there remains considerable room for improving their operating characteristics. Exemplary description of illustrative flow batteries, their use, and operating characteristics is provided hereinbelow.

Because of their well-understood and facile oxidation-reduction profile (see FIG. 2), iron hexacyanide complexes can be an active material of choice for electrolyte solutions used in conjunction with flow batteries and related electrochemical energy storage systems. However, the marginal aqueous solubility of this active material can limit its utility for applications where high energy densities are desirable. Particularly in highly buffered electrolyte solutions, the already marginal solubility of iron hexacyanide complexes can become unacceptably poor.

Typical approaches for buffering an aqueous solution usually involve dissolving a soluble buffer material until a desired extent of buffering capacity is reached. The desired extent of buffering capacity can often be dictated by the amount of acid or base that is anticipated to eventually contact the aqueous solution. That is, when the amount of acid or base is large, the amount of dissolved buffer material can be correspondingly large or larger on a molar basis. Since large amounts of a dissolved buffer can lead to decreased aqueous solubility of iron hexacyanide complexes, extensive buffering can be undesirable for electrolyte solutions containing a dissolved iron hexacyanide complex, particularly if high energy densities are to be maintained. Without being bound by any theory or mechanism, it is believed that the dissolved buffer material produces a common ion effect that shifts the equilibrium solubility of the iron hexacyanide complex toward an undissolved state. That is, the dissolved buffer material increases the ionic strength of the electrolyte solution to such a degree that the iron hexacyanide complex no longer attains its maximum solubility. The decrease in solubility can be particularly prevalent when the dissolved buffer material introduces the same counterion as that initially present in the iron hexacyanide complex. This is chemical phenomenon is frequently referred to as the "common ion" effect.

The present inventor recognized that buffering systems based upon a solid buffer material can provide a number of advantages when used in combination with a dissolved iron hexacyanide complex. Similar advantages can also be realized when buffering aqueous electrolyte solutions containing other types of active materials as well. More specifically, the inventor identified that contacting a sparingly soluble buffer material with an aqueous solution in an amount greater than that needed to produce a saturation concentration of the buffer material can provide improved solubility performance for iron hexacyanide complexes. Accordingly, the solid material is only partially dissolved in the aqueous solutions described herein, and undissolved buffer material remains in contact with the aqueous solution. The partially dissolved buffer material can impact the solubility of dissolved iron hexacyanide complexes to a lesser degree than does a freely dissolved buffer, as explained in more detail hereinafter. Because the saturation concentration of the solid buffer material is fixed at a given temperature, the foregoing approach can require less experimental testing than needed for adjusting the concentration of a freely soluble buffer to accomplish a similar retention in solubility of the iron hexacyanide complex. In fact, by employing a solid buffer material at its saturation concentration in accordance with the embodiments described herein, dissolved iron hexacyanide complexes can be rendered at least as soluble as in unbuffered aqueous solutions of comparable pH and ionic strength.

Lithium salts can constitute especially suitable solid buffer materials for use in the various embodiments of the present disclosure. Many lithium salts are weakly ionizing and have relatively low aqueous solubility values as a result. Moreover, lithium ions have a much smaller size compared to other alkali metal ions (e.g., sodium and potassium), and therefore can lead to a much less significant effect on solubility. It is believed that dissolved lithium ions lead to much less pronounced effects on ionic strength and do not exert a common ion effect in the presence of sodium and/or potassium counterions from a dissolved iron hexacyanide complex. Hence, lithium ions are much less prone to drive the equilibrium solubility of iron hexacyanide complexes toward an undissolved state. Moreover, like other alkali metal ions, lithium ions are generally not considered to be detrimental toward thin membranes used in flow batteries and other types of electrochemical systems.

As mentioned above, the solubility of iron hexacyanide complexes can be impacted by the identity of the counterion (s) that are present. Surprisingly, mixed sodium and potassium counterions can be particularly effective in enhancing solubility of iron hexacyanide complexes at alkaline pH values compared to complexes containing only a single type of counterion. By further diversifying the counterion profile of dissolved iron hexacyanide complexes with lithium ions from the partially dissolved buffer material, the solubility of iron hexacyanide complexes can be enhanced even further. The enhancement in solubility can be realized even in instances where only a single counterion (e.g., sodium or potassium but not both) is present before interaction with the lithium ions. However, the solubility increase of the iron hexacyanide complexes can be more pronounced when both sodium and potassium ions are present in combination with the dissolved lithium ions.

Although it is ordinarily desirable to have all components of an electrolyte solution in a flow battery present in dissolved form, the presence of a solid buffer material does not present an operationally significant impediment. In unbuffered iron hexacyanide solutions, the pH can change quickly and unexpectedly during operation of a flow battery, which can lead to decomposition of the iron hexacyanide and/or formation of precipitates. Unexpectedly formed circulating particulates of the iron hexacyanide complex can quickly and irreversibly damage various flow battery components, including the thin film separator between the half-cells, flow conduits, pumps and the like. Solid buffer materials, in contrast, do not present such an issue, since their presence can be planned for during design and construction of the flow battery. Namely, the solid buffer material can be constrained in such a way that it can effectively interact with the aqueous solution to produce a buffering effect but without generating circulating particulates that would otherwise be damaging toward various flow battery components. Illustrative retaining enclosures for constraining a solid buffer material and deployment locations within a flow battery are described hereinbelow.

Finally, although the disclosure herein is primarily directed toward improving the solubility iron hexacyanide complexes in aqueous solutions, it is to be recognized that the embodiments of the present disclosure can also be utilized to realize similar benefits for other types of active materials having marginal solubility. That is, solid buffer materials can provide similar solubility benefits when used in conjunction with other types of active materials that are subject to decreased solubility in the presence of dissolved ions from a buffer material. Furthermore, the solid buffer materials of the present disclosure can help scrub undesired metal ions, such as $Ca^{2+}$, from solution by forming an insoluble species over time upon reacting with the buffer.

Accordingly, the present disclosure provides compositions in which an iron hexacyanide complex is present in relatively high concentrations within a buffered aqueous solution. The buffered aqueous solutions can be used as at least one of the electrolyte solutions within a flow battery. Such high-concentration electrolyte solutions can improve the energy density and other operating characteristics of the flow battery relative to the performance attainable using lower-concentration electrolyte solutions. Exemplary operating characteristics are discussed in more detail hereinbelow.

In various embodiments, compositions of the present disclosure can include an aqueous solution containing a dissolved iron hexacyanide complex, and a solid buffer material in contact with the aqueous solution. An amount of the solid buffer material is greater than that needed to produce a saturation concentration of the solid buffer material in the aqueous solution. The solid buffer material is considered to be partially soluble or sparingly soluble in the aqueous solution. Accordingly, the aqueous solution is saturated with a dissolved portion of the solid buffer material and the remaining solid buffer material maintains contact with the aqueous solution at a solid-liquid interface. The dissolved portion of the solid buffer material allows the aqueous solution to resist changes in pH. Upon reacting the dissolved portion of the solid buffer material with an acid or base, an additional portion of the solid buffer material can then dissolve from the solid-liquid interface to maintain the buffering effect but without unacceptably compromising the solubility of the dissolved iron hexacyanide complex. In various embodiments, the aqueous solution can be rendered stable toward precipitation of the iron hexacyanide complex over a temperature ranging between about −10° C. and about 60° C.

As used herein, the term "saturation concentration" will refer to a concentration above which no more material will stably dissolve at a given temperature. One can determine the saturation concentration of a solid buffer material in an aqueous solution by incrementally adding the solid and agitating until no more solid dissolved. Determination of whether solid remains can be performed visually or with various instrumental techniques, such as turbidity measurements.

As used herein, the term "aqueous solution" will refer to a homogeneous liquid phase with water as a predominant solvent in which a component of interest (e.g., an iron hexacyanide complex) is fully solubilized. This definition encompasses both solutions in water and solutions containing a water-miscible organic solvent as a minority component of an aqueous phase. According to the various embodiments of the present disclosure, a solid buffer material is present in an aqueous solution containing a dissolved iron hexacyanide complex. That is, the presence of the solid buffer material does not diminish the fact that the aqueous solutions of the present disclosure maintain the iron hexacyanide complex in dissolved form.

Illustrative water-miscible organic solvents that can be present in the aqueous solutions of the present disclosure include, for example, alcohols and glycols, optionally in the presence of one or more surfactants or other components discussed below. In more specific embodiments, the aqueous solution can contain at least about 98% water by weight. In other more specific embodiments, the aqueous solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, the aqueous solution can be free of water-miscible organic solvents and consist of water alone as a solvent.

In further embodiments, the aqueous solutions can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, the aqueous solutions can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in the aqueous solution can help promote dissolution of the iron hexacyanide complex and/or reduce its viscosity for conveyance through a flow battery, for example. In addition, a wetting agent can improve contact of the aqueous solution with an electrode in order to promote an electrochemical reaction.

The solid buffer materials (i.e., the dissolved portion of the solid buffer material) used in the various embodiments of the present disclosure employing an iron hexacyanide complex can maintain the aqueous solution at an alkaline pH. As used herein, the term "alkaline pH" will refer to any pH value between 7 and 14. In more specific embodiments, the dissolved portion of the solid buffer material can maintain the aqueous solution at a pH of about 9 to about 12. A pH residing within a range of about 9 to about 12 can be particularly desirable for maintaining the iron hexacyanide complex in a region where it has optimal solubility and stability properties. These pH conditions can also be particularly compatible for use in conjunction with a flow battery and its various components. Other illustrative alkaline pH ranges that can be maintained by the dissolved portion of the solid buffer material include, for example, about 7 to about 7.5, or about 7.5 to about 8, or about 8 to about 8.5, or about 8.5 to about 9, or about 9.5 to about 10, or about 10 to about 10.5, or about 10.5 to about 11, or about 11 to about 11.5, or about 11.5 to about 12, or about 12 to about 12.5, or about 12.5 to about 13, or about 13 to about 13.5, or about 13.5 to about 14. Suitable solid buffer materials for attaining the foregoing pH ranges are discussed in more detail below.

Although alkaline pH values can be desirable for iron hexacyanide complexes, other pH ranges, including acidic pH ranges, can be desirable for other types of active materials. Thus, with the benefit of the present disclosure, one having ordinary skill in the art can choose an appropriate solid buffer material and operative pH range for alternative embodiments employing other active materials within an aqueous solution.

As indicated above, suitable solid buffer materials are not believed to be particularly limited, provided that they can provide buffering in an alkaline pH range and have marginal solubility in the aqueous solution. As an example of the marginal solubility consistent with the embodiments of the present disclosure, the solid buffer material can have a saturation concentration ranging between about 0.05M and about 0.5M at a temperature of about 25° C. Saturation concentrations within the foregoing range can still provide sufficient buffering capacity while not unacceptably compromising the solubility of the iron hexacyanide complex. In more particular embodiments, the solid buffer material can have a saturation concentration ranging between about 0.05M and about 0.1M at a temperature of about 25° C., or a saturation concentration ranging between about 0.05M and about 0.2M, or a saturation concentration ranging between about 0.1M and about 0.25M, or a saturation concentration ranging between about 0.25M and about 0.5M.

In illustrative embodiments, the solid buffer material can be a lithium salt. Due to their lower propensity toward ionization, lithium salts of a given anion can display a decreased degree of solubility compared to the corresponding sodium and potassium salt forms. One can estimate, if needed, the buffering capacity of a lithium salt at a given concentration by examining the more-soluble sodium or potassium salt forms. Suitable lithium salts follow below.

In more particular embodiments, suitable lithium salts can include, for example, lithium acetylacetonate, lithium barbital (lithium 5,5-diethylpyrimidine-2,4,6(1H,3H,5H)-trione), lithium carbonate, lithium phosphate, lithium hydrogen phosphate, lithium dihydrogen phosphate, lithium diphosphate, lithium triphosphate, lithium phosphonate, a lithium carboxylic acid salt, a lithium α-hydroxycarboxylic acid salt, a lithium amino acid salt, or any combination thereof. In more particular embodiments, the solid buffer material can be lithium carbonate.

Lithium carboxylic acid salts, including salts of α-hydroxycarboxylic acids and amino acids, can include any carboxylic acid which produces a sparingly soluble salt form in combination with a lithium ion. Suitable carboxylic acids can include, for example, aliphatic and aromatic C1-C12 carboxylic acids, which can be monocarboxylic acids, dicarboxylic acids, or tricarboxylic acids in non-limiting embodiments. When more than one carboxylic acid is present, multiple lithium ions can be present. Specific examples of suitable carboxylic acids include, for example, acetic acid, propionic acid, butanoic acid, hexanoic acid, octanoic acid, oxalic acid, succinic acid, benzoic acid, and phthalic acid. Other suitable carboxylic acids and α-hydroxycarboxylic acids can include, for example, ascorbic acid, citric acid, malic acid, maleic acid, lactic acid and gluconic acid. Suitable amino acids can include any compound containing both an amino group and a carboxylic acid group, including both naturally and non-naturally occurring α-amino acids, and oligomers thereof. As used herein, the term "oligomer" will refer to any compound containing up to 10 amino acid residues that are bound to one another through peptide bonds, more particularly up to 5 amino acid residues, and still more particularly up to 3 amino acid residues. Illustrative amino acids that can be present in the solid buffer material in various forms include, for example, arginine, histidine, lysine, aspartic acid, glutamic acid, serine, threonine, asparagine, glutamine, cysteine, glycine, proline, alanine, valine, isolucine, leucine, methionine, phenylalanine, tyrosine, and tryptophan, as well as N-alkyl derivatives thereof (e.g. N-methyl derivatives such as N-methylglycine).

In other various embodiments, the solid buffer material can be a sparingly soluble lithium salt of a sulfonic acid compound also containing a basic functional group. Illustrative solid buffer materials of this type can include, for example, a lithium salt of 4-(2-hydroxyethyl)-1-piperazineethanesulfonic acid (Li-HEPES), and piperazine-N,N'-bis(ethanesulfonic acid) (Li-PIPES).

In still other various embodiments, the solid buffer material can be a sparingly soluble lithium salt of a chelating agent, such as a mono-, di-, tri-, or tetra-lithium salt of ethylenediamine tetraacetic acid. The presence of a chelating agent can help sequester any problematic metal ions that may inadvertently be present in the aqueous solution.

Although the solid buffer material can be a lithium salt in various embodiments of the present disclosure, it need not necessarily be so. As indicated above, any solid buffer material that has partial solubility in the aqueous solution and maintains an alkaline pH can be used in the various embodiments of the present disclosure employing iron hexacyanide complexes. Other suitable solid buffers materials can include, for example, a buffering agent that is adhered to an insoluble solid support. Such buffer materials can similarly result in dissolution of the buffering agent from a solid-liquid interface. The adhered buffering agent can be a soluble or partially soluble buffer material, including those indicated above. Suitable solid supports can include, for example, polymer supports such as those used in solid-phase synthesis techniques, and ceramic supports. Illustrative examples will be familiar to one having ordinary skill in the art, such as DOWEX polymer-supported ion-exchange resins.

In still other alternative embodiments, at least a portion of the solid buffer material can include, for example, a solid buffer material selected from calcium carbonate, calcium phosphate, magnesium carbonate, magnesium phosphate, zinc carbonate, zinc phosphate, and any combination thereof. In some embodiments, these solid buffer materials can be used alone, and in other embodiments they can be used in combination with a lithium salt buffer. Solid buffer materials of this type may be more easily used in combination with porous separator materials.

As mentioned above, the ultimate solubility of the iron hexacyanide complex in the aqueous solution can also be determined, at least in part, by the salt form defined by its counterions. Particularly suitable counterion forms for the iron hexacyanide complex can include, for example, the sodium salt form, the potassium salt form, or a combination of these salt forms. As indicated above, when the dissolved iron hexacyanide complex is in a mixed salt containing sodium and potassium ions, the solubility can be enhanced compared to either of the individual salt forms. Further, as discussed above, the presence of lithium ions in combination with sodium ions, potassium ions, or any combination thereof can provide further enhancements in solubility.

More generally, the dissolved iron hexacyanide complex can contain a first positive counterion and a second positive counterion. In some embodiments, the first positive counterion and the second positive counterion can differ from one another. In combination with a lithium salt buffer, one of the positive counterions associated with the iron hexacyanide complex can be a lithium ion. The lithium ion can be present in combination with sodium ions and/or potassium ions.

In more specific embodiments, the dissolved iron hexacyanide complex can be a mixed salt containing both sodium ions and potassium ions. That is, the iron hexacyanide complex can have a formula of $Na_xK_y[Fe(CN)_6]^{3-/4-}$, wherein x+y=3 or 4 depending upon whether the iron hexacyanide complex is in oxidized or reduced form. The molar ratio of sodium ions to potassium ions can range between about 1:10 to about 10:1, or between about 1:5 to about 5:1, or between about 1:2 to about 2:1. In some embodiments, a substantially equal molar ratio of sodium ions and potassium ions can be present (i.e., x=y). In the presence of lithium ions from the solid buffer material, the solution form of the iron hexacyanide complex can be expressed as of $Na_xK_yLi_z[Fe(CN)_6]^{3-/4-}$, wherein x+y+z=3 or 4 depending upon whether iron hexacyanide complex is in oxidized or reduced form. In further embodiments, a molar ratio of lithium to the sum of sodium ions plus potassium ions can range between about 1:5 and about 1:20 (i.e., z=1 and 5≤x+y≤20), more particularly a range of about 1:10 to about 1:20.

In various embodiments, the dissolved iron hexacyanide complex can have a concentration in the aqueous solution ranging between about 1M and about 3M at a temperature of about 25° C. The amount of dissolved iron hexacyanide complex can be dictated, at least in part, by the counterion form of the iron hexacyanide complex and its ultimate solubility limit. When both sodium and potassium counterions are present, the solubility of the iron hexacyanide complex can be enhanced to some degree and the stability of the solution can be increased.

In more particular embodiments, the dissolved iron hexacyanide complex can have a concentration in the aqueous solution ranging between about 1M and about 2M at a temperature of about 25° C. In still more particular embodiments, the dissolved iron hexacyanide complex can have a concentration in the aqueous solution ranging between about 1M and about 1.8M at a temperature of about 25° C., or a concentration ranging between about 1.2M and about 1.8M, or a concentration ranging between about 1.2M and about 1.6M, or a concentration ranging between about 1.4M and about 1.6M.

Accordingly, in the various embodiments of the present disclosure the solid buffer material can be present in the aqueous solution in equilibrium with its dissolved form. The undissolved portion of the solid buffer material can be present in any form in the aqueous solution. However, to avoid the occurrence of circulating particulates, it can be desirable to constrain the solid buffer material in some manner when it is in contact with the aqueous solution. Suitable constructs for constraining the solid buffer material in a desired location in contact with the aqueous solution are addressed hereinafter.

In some embodiments, the solid buffer material can be housed in a retaining enclosure within the aqueous solution. The retaining enclosure is configured to release a dissolved portion of the solid buffer material to the aqueous solution. In some embodiments, suitable retaining enclosures can be constructed from materials that are permeable to the aqueous solution, such that the aqueous solution can interact with the solid buffer material to affect its partial dissolution, while still mechanically retaining the solid buffer material. In illustrative embodiments, the solid buffer material can be housed in a bag, pouch or similar structure formed from a porous paper or polymer material. The bag or pouch can be held at a fixed location within the aqueous solution or a flow battery containing such an aqueous solution, or the bag or pouch can freely move about the aqueous solution. In either case, the retaining enclosure can preclude the release of circulating particulates of the solid buffer material. Suitable deployment locations within a flow battery can include, for example, within a storage tank containing the aqueous solution or within piping delivering the aqueous solution to a half-cell of the flow battery. In some embodiments, the retaining enclosure and its solid buffer material can be situated proximal to a location where the electrolyte solution exits its corresponding half-cell of the flow battery.

In other various embodiments, the solid buffer material can be housed in a cartridge through which the aqueous solution flows. The aqueous solution can interact with the solid buffer material in the cartridge to affect partial dissolution of the solid buffer material as the aqueous solution flows. The cartridge can further include filters, membranes or the like to preclude the release and transport of circulating particulates of the solid buffer material.

In still other embodiments, the solid buffer material can be constrained behind a porous screen. The aqueous solution can access both sides of the porous screen to affect partial dissolution of the solid buffer material, whereas the solid buffer material remains constrained behind one side of the screen.

In alternative embodiments, the solid buffer material can be adhered to a solid support that is in contact with the aqueous solution. As with other embodiments, the aqueous solution can interact with the solid buffer material to affect its partial dissolution without generating circulating particulates.

As indicated above, flow batteries and energy storage media having the compositions disclosed herein as an electrolyte solution are also contemplated by the various embodiments of the present disclosure. More specifically, flow batteries of the present disclosure can include a half-cell having an electrolyte solution therein containing the various compositions described hereinabove. In some embodiments, the electrolyte solution can be an aqueous solution containing a dissolved iron hexacyanide complex. In other embodiments, the electrolyte solution can be an aqueous solution containing a different electroactive material. In either case, a solid buffer material can be in contact with the aqueous solution at an amount greater than that needed to produce a saturation concentration of the solid buffer material in the aqueous solution. Additional disclosure regarding flow batteries of the present disclosure and their operating characteristics follows hereinbelow.

Illustrative flow batteries that can incorporate the foregoing aqueous solutions as an electrolyte will now be described in further detail. The flow batteries of the present disclosure are, in some embodiments, suited to sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like and any combination thereof.

Further, it is to be appreciated that while the disclosure herein is generally directed to flow batteries, other electrochemical energy storage media can incorporate the electrolyte solutions described herein, specifically those utilizing stationary electrolytes.

In some embodiments, flow batteries of the present disclosure can include: a first chamber containing a negative electrode contacting a first aqueous electrolyte; a second chamber containing a positive electrode contacting a second aqueous electrolyte, and a separator disposed between the first and second electrolytes. The electrolyte chambers provide separate reservoirs within the cell, through which the first and/or second electrolytes circulate so as to contact the respective electrodes and the separator. Each chamber and its associated electrode and electrolyte define a corresponding half-cell. In the case of an electrolyte solution containing a dissolved iron hexacyanide complex, the aqueous solution is present in the half cell containing the positive electrode. The separator provides several functions which include, for example, (1) serving as a barrier to mixing of the first and second electrolytes, (2) electrically insulating to reduce or prevent short circuits between the positive and negative electrodes, and (3) to facilitate ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolytes can be transported from separate storage tanks through the corresponding electrolyte chambers. In a charging cycle, electrical power can be applied to the cell such that the active material contained in the second electrolyte undergoes a one or more electron oxidation and the active material in the first electrolyte undergoes a one or more electron reduction. Similarly, in a discharge cycle the second electrolyte is reduced and the first electrolyte is oxidized to generate electrical power.

In more specific embodiments, illustrative flow batteries of the present disclosure can include: (a) a first aqueous electrolyte containing a first coordination compound; (b) second aqueous electrolyte containing a second coordination compound; (c) a separator positioned between said first and second aqueous electrolytes; and (d) a mobile ion in the first and second aqueous electrolytes. As described in more detail below, the separator can be an ionomer membrane, and it can have a thickness of less than 100 microns and have an associated net charge that is the same sign as that of the first and second coordination compounds. In some embodiments, at least one of the first and second coordination compounds can include a catecholate ligand. In some or other embodiments, one of the first and second coordination compounds can be a redox couple of ferricyanide [$Fe(CN)_6^{3-}$] and ferrocyanide [$Fe(CN)_6^{4-}$]. In more specific embodiments, the ferricyanide/ferrocyanide redox couple can be used as a second coordination compound and the first coordination compound can be a coordination compound containing a catecholate ligand, particularly a titanium coordination compound. The iron hexacyanide compound can undergo oxidation during a charging cycle and reduction during a discharging cycle.

FIG. 1 depicts a schematic of an illustrative flow battery. Unlike typical battery technologies (e.g., Li-ion, Ni-metal hydride, lead-acid, and the like), where active materials and other components are housed in a single assembly, flow batteries transport (e.g., via pumping) redox active energy storage materials from storage tanks through an electrochemical stack. This design feature decouples the electrical energy storage system power from the energy storage capacity, thereby allowing for considerable design flexibility and cost optimization.

As shown in FIG. 1, flow battery system 1 includes an electrochemical cell that features separator 20 (e.g., a membrane) that separates the two electrodes 10 and 10' of the electrochemical cell. Electrodes 10 and 10' are formed from a suitably conductive material, such as a metal, carbon, graphite, and the like. Tank 50 contains first active material 30, which is capable of being cycled between an oxidized and reduced state.

Pump 60 affects transport of first active material 30 from tank 50 to the electrochemical cell. The flow battery also suitably includes second tank 50' that contains second active material 40. Second active material 40 can be the same material as active material 30, or it can be different. Second pump 60' can affect transport of second active material 40 to the electrochemical cell. Pumps can also be used to affect transport of the active materials from the electrochemical cell back to tanks 50 and 50' (not shown in FIG. 1). Other methods of affecting fluid transport, such as siphons, for example, can also suitably transport first and second active materials 30 and 40 into and out of the electrochemical cell. Also shown in FIG. 1 is power source or load 70, which completes the circuit of the electrochemical cell and allows a user to collect or store electricity during its operation.

It should be understood that FIG. 1 depicts a specific, non-limiting embodiment of a flow battery. Accordingly, flow batteries consistent with the spirit of the present disclosure can differ in various aspects relative to the configuration of FIG. 1. As one example, a flow battery system can include one or more active materials that are solids, gases, and/or gases dissolved in liquids. Active materials can be stored in a tank, in a vessel open to the atmosphere, or simply vented to the atmosphere.

As used herein, the terms "separator" and "membrane" refer to an ionically conductive and electrically insulating material disposed between the positive and negative electrodes of an electrochemical cell. The separator can be a porous membrane in some embodiments and/or an ionomer membrane in other various embodiments. In some embodiments, the separator can be formed from an ionically conductive polymer.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—$CF=CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer, and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of chemicals (e.g., active materials) passing through the separator from one electrode to another and causing cross-contamination and/or reduction in cell energy efficiency. The degree of this cross-contamination can depends on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination compound, the average diameter of the coordination compound can be about 50% greater than the average pore size of the porous membrane. On the other hand, if a porous membrane has substantially uniform pore sizes, the average diameter of the coordination compound can be about 20% larger than the average pore size of the porous membrane. Likewise, the average diameter of a coordination compound is increased when it is further coordinated with at least one water molecule. The diameter of a coordination compound of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania amorphous silica, amorphous titania, rubber, asbestos, wood or any combination thereof.

Separators within the flow batteries of the present disclosure can have a membrane thickness of less than about 500 micrometers, less than about 300 micrometers, less than about 250 micrometers, less than about 200 micrometers, less than about 100 micrometers, less than about 75 micrometers, less than about 50 micrometers, less than about 30 micrometers, less than about 25 micrometers, less than about 20 micrometers, less than about 15 micrometers, or less than about 10 micrometers. Suitable separators can include those in which the flow battery is capable of operating with a current efficiency of greater than about 85% with a current density of 100 mA/cm$^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The diffusion rate of the first and second active materials through the separator can be less than about $1\times10^{-5}$ mol cm$^{-2}$ day$^{-1}$, less than about $1\times10^{-6}$ mol cm$^{-2}$ day$^{-1}$, less than about $1\times10^{-2}$ mol cm$^{-2}$ day$^{-1}$, less than about $1\times10^{-9}$ mol cm$^{-2}$ day$^{-1}$, less than about $1\times10^{-11}$ mol cm$^{-2}$ day$^{-1}$, less than about $1\times10^{-13}$ mol cm$^{-2}$ day$^{-1}$, or less than about $1\times10^{-15}$ mol cm$^{-2}$ day$^{-1}$.

The flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox active materials under the conditions of the operating flow battery. Further exemplary embodiments of a flow battery provide that (a) the first active material has an associated net positive or negative charge and is capable of providing an oxidized or reduced form over an electric potential in a range the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" will refer to the amount of ions passing through the ionomer membrane, balancing the charge associated with the flow of external electricity/electrons. That is, the flow battery is capable of operating or operates with the substantial exclusion of the active materials by the ionomer membrane.

Flow batteries incorporating the electrolyte solutions of the present disclosure can have one or more of the following operating characteristics: (a) where, during the operation of the flow battery, the first or second active materials comprise less than about 3% of the molar flux of ions passing through the ionomer membrane; (b) where, the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 µm, less than about 75 µm, less than about 50 µm, or less than about 250 µm; (f) where the flow battery is capable of operating at a current density of greater than about 100 mA/cm$^2$ with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than available from a single battery cell. In such cases, several battery cells can be connected in series such that the voltage of each cell is additive. This forms a bipolar stack. An electrically conductive, but non-porous material (e.g., a bipolar plate) can be employed to connect adjacent battery cells in a bipolar stack, which allows for electron transport but prevents fluid or gas transport between adjacent cells. The positive electrode compartments and negative electrode compartments of individual cells can be fluidically connected via common positive and negative fluid manifolds in the stack. In this way, individual cells can be stacked in series to yield a voltage appropriate for DC applications or conversion to AC applications.

In additional embodiments, the cells, cell stacks, or batteries can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. Any of these locations can be suitable for deploying a solid buffer material in accordance with the embodiments of the present disclosure. The cells, cell stacks, and batteries of this disclosure can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack); storage tanks and piping for containing and transporting the electrolyte solutions; control hardware and software (which may include safety systems); and a power conditioning unit. The flow battery cell stack accomplishes the conversion of charging and discharging cycles and determines the peak power. The storage tanks contain the positive and negative active materials, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Where not otherwise defined hereinabove or understood by one having ordinary skill in the art, the definitions in the following paragraphs will be applicable to the present disclosure.

As used herein, the term "energy density" will refer to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad (1)$$

where OCV is the open circuit potential at 50% state of charge, (26.8 A-h/mol) is Faraday's constant, and $[e^-]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad (2)$$

where [active materials] is the molar concentration of the active material in either the negative or positive electrolyte, whichever is lower, and N is the number of electrons transferred per molecule of active material. The related term "charge density" will refer to the total amount of charge that each electrolyte contains. For a given electrolyte, the charge density can be calculated by Equation 3

$$\text{Charge density} = (26.8 \text{ A-h/mol}) \times [\text{active material}] \times N \quad (3)$$

where [active material] and N are as defined above.

As used herein, the term "current density" will refer to the total current passed in an electrochemical cell divided by the geometric area of the electrodes of the cell and is commonly reported in units of mA/cm$^2$.

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" can be described as the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,rt}$) at a given current density can be calculated from the cell voltage at discharge ($V_{discharge}$) and the voltage at charge ($V_{charge}$) using equation 4:

$$V_{EFF,RT} = V_{discharge}/V_{charge} \times 100\% \quad (4)$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

EXAMPLES

Various buffer systems were formulated as set forth in Table 1, and a mixed sodium potassium hexacyanoferrate salt [i.e., $Na_2K_2Fe(CN)_6$] was added up to the saturation solubility. To this end, equimolar amounts of solid sodium ferrocyanide decahydrate and potassium ferrocyanide trihydrate were dissolved in deionized water with stirring and subsequent filtration through a 0.2 μm filter. The added quantities were such to achieve 1.5M $Fe(CN)_6^{4-}$ as measured spectroscopically using the absorbance band at 320 nm. For buffered solutions, the appropriate salts described in Table 1 were dissolved before the incremental addition of equimolar solid $Na_4Fe(CN)_6$ and $K_4Fe(CN)_6$ up to the saturation limit, which was then determined spectroscopically. $Li_3HEDTA$ was prepared by mixing the acid form of $H_4EDTA$ with lithium hydroxide monohydrate in an appropriate ratio of water. The data in Table 1 shows that the solubility of the iron hexacyanide complex was at least comparable or greater than that observed when more soluble sodium and/or potassium buffer materials were used. In Table 1, the calculated buffer capacity assumes that only a single reversibly protonatable functional group reacts to promote the buffering effect.

TABLE 1

| Buffer Material | $Na_2K_2Fe(CN)_6$ Solubility at 20° C. (M) | Buffer Capacity (M) |
|---|---|---|
| 0.1M sodium potassium phosphate (soluble) | 1.5 | 0.1 |
| 0.3M sodium potassium phosphate (soluble) | 1.35 | 0.3 |
| 0.5M sodium potassium phosphate (soluble) | 1.2 | 0.5 |
| 0.25M $Li_3HEDTA$ | 1.4 | 0.25 |
| 0.18M $Li_2CO_3$ (soluble) plus additional solid $Li_2CO_3$ (additional 0.12M if dissolved) in contact with the aqueous solution | 1.6 | 0.3 |

Figure 2:
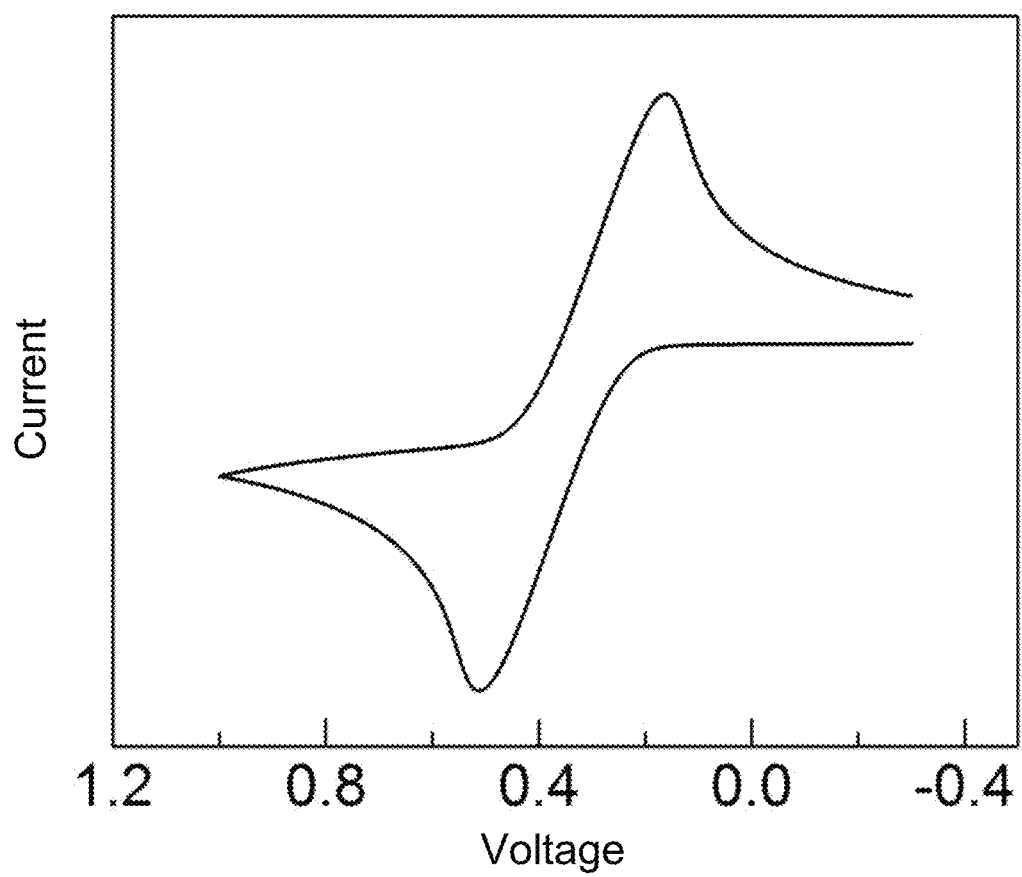
FIG. 2 shows an illustrative cyclic voltammogram of $Fe(CN)_6^{3/4-}$ in an aqueous solution saturated with lithium carbonate.

FIG. 2 shows an illustrative cyclic voltammogram of $Fe(CN)_6^{3/4-}$ in an aqueous solution saturated with lithium carbonate (i.e., the last entry of Table 1). The characteristic shape of the cyclic voltammogram indicates that the lithium carbonate does not appreciably impact the oxidation and reduction properties. The x-axis voltage was measured against an Ag/AgCl reference.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A composition comprising:
    an aqueous solution comprising a dissolved iron hexacyanide complex; and
    a solid buffer material in contact with the aqueous solution, an amount of the solid buffer material being greater than that needed to produce a saturation concentration of the solid buffer material in the aqueous solution,
    wherein the composition is a battery electrolyte.

2. The composition of claim 1, wherein a dissolved portion of the solid buffer material maintains the aqueous solution at an alkaline pH.

3. The composition of claim 2, wherein the dissolved portion of the solid buffer material maintains the aqueous solution at a pH of about 9 to about 12.

4. The composition of claim 2, wherein the solid buffer material comprises a lithium salt.

5. The composition of claim 4, wherein the lithium salt is selected from the group consisting of lithium acetylacetonate, lithium barbital, lithium carbonate, lithium phosphate, lithium hydrogen phosphate, lithium dihydrogen phosphate, lithium phosphonate, a lithium carboxylic acid salt, a lithium α-hydroxycarboxylic acid salt, a lithium amino acid salt, and any combination thereof.

6. The composition of claim 1, wherein the dissolved iron hexacyanide complex comprises a first positive counterion, and the solid buffer material comprises a second positive counterion, the first positive counterion and the second positive counterion differing from one another.

7. The composition of claim 6, wherein the second positive counterion comprises a lithium ion.

8. The composition of claim 1, wherein the solid buffer material is housed in a retaining enclosure within the aqueous solution, the retaining enclosure being configured to release a dissolved portion of the solid buffer material to the aqueous solution.

9. The composition of claim 1, wherein the dissolved iron hexacyanide complex has a concentration in the aqueous solution ranging between about 1M and about 3M at a temperature of about 25° C.

10. The composition of claim 9, wherein the dissolved iron hexacyanide complex comprises sodium and potassium counterions.

11. The composition of claim 1, wherein the dissolved iron hexacyanide complex has a concentration in the aqueous solution ranging between about 1M and about 2M at a temperature of about 25° C.

12. The composition of claim 1, wherein the saturation concentration of the solid buffer material ranges between about 0.05M and about 0.5M at a temperature of about 25° C.

13. A flow battery comprising:
    a half-cell having the electrolyte of claim 1.

14. The flow battery of claim 13, wherein the dissolved iron hexacyanide complex has a concentration in the aqueous solution ranging between about 1M and about 3M at a temperature of about 25° C.

15. The flow battery of claim 13, wherein the dissolved iron hexacyanide complex has a concentration in the aqueous solution ranging between about 1M and about 2M at a temperature of about 25° C.

16. The flow battery of claim 13, wherein a dissolved portion of the solid buffer material maintains the aqueous solution at an alkaline pH.

17. The flow battery of claim 16, wherein the dissolved portion of the solid buffer material maintains the aqueous solution at a pH of about 9 to about 12.

18. The flow battery of claim 13, wherein the solid buffer material comprises a lithium salt.

19. The flow battery of claim 13, wherein the half-cell contains a positive electrode.

20. The flow battery of claim 13, wherein the solid buffer material is housed in a retaining enclosure within the aqueous solution, the retaining enclosure being configured to release a dissolved portion of the solid buffer material to the aqueous solution.

21. The flow battery of claim 13, wherein the saturation concentration of the solid buffer material ranges between about 0.05M and about 0.5M at a temperature of about 25° C.

22. A flow battery comprising:
- a half-cell having an electrolyte solution therein comprising an aqueous solution comprising a dissolved electroactive material; and
- a solid buffer material in contact with the aqueous solution, an amount of the solid buffer material being greater than that needed to produce a saturation concentration of the solid buffer material in the aqueous solution.

\* \* \* \* \*